United States Patent
Wong et al.

(10) Patent No.: US 7,903,900 B2
(45) Date of Patent: Mar. 8, 2011

(54) LOW COMPLEXITY COLOR DE-NOISING FILTER

(75) Inventors: Hon Wah Wong, Kwun Tong (HK); Ka Man Cheng, Ngau Tau Kok (HK); Kar Kin Edwin Lee, Tin Shui Wai (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 1012 days.

(21) Appl. No.: 11/694,103

(22) Filed: Mar. 30, 2007

(65) Prior Publication Data
US 2008/0239155 A1 Oct. 2, 2008

(51) Int. Cl.
*G06K 9/40* (2006.01)
*H04B 1/66* (2006.01)

(52) U.S. Cl. ............... 382/264; 382/260; 375/240

(58) Field of Classification Search ........... 382/254, 382/260–264, 266–268, 275; 375/240–241
See application file for complete search history.

(56) References Cited

U.S. PATENT DOCUMENTS

| | | | | |
|---|---|---|---|---|
| 4,446,484 A * | 5/1984 | Powell | .......... | 348/625 |
| 5,233,670 A * | 8/1993 | Dufour et al. | .......... | 382/197 |
| 5,241,370 A | 8/1993 | Desor | | |
| 5,432,869 A | 7/1995 | Matsumoto | | |
| 6,185,320 B1 * | 2/2001 | Bick et al. | .......... | 382/132 |
| 6,236,763 B1 * | 5/2001 | Wong et al. | .......... | 382/261 |
| 6,667,815 B1 | 12/2003 | Nagao | | |
| 6,980,326 B2 | 12/2005 | Tsuchiya | | |
| 7,346,226 B2 * | 3/2008 | Shyshkin | .......... | 382/275 |
| 7,409,103 B2 * | 8/2008 | Nishi et al. | .......... | 382/275 |
| 7,430,337 B2 * | 9/2008 | Deshpande et al. | .......... | 382/275 |
| 7,457,438 B2 * | 11/2008 | Nair | .......... | 382/107 |
| 7,463,688 B2 * | 12/2008 | Lin et al. | .......... | 375/240.18 |
| 7,697,782 B2 * | 4/2010 | Pan | .......... | 382/275 |
| 2002/0181770 A1 * | 12/2002 | Jaspers | .......... | 382/167 |
| 2004/0120597 A1 * | 6/2004 | Le Dinh | .......... | 382/261 |
| 2004/0213345 A1 * | 10/2004 | Holcomb et al. | .......... | 375/240.03 |
| 2006/0050182 A1 | 3/2006 | Lee | | |
| 2006/0055985 A1 | 3/2006 | Ikeda | | |
| 2006/0245660 A1 * | 11/2006 | Hung | .......... | 382/254 |
| 2007/0140587 A1 * | 6/2007 | Wong et al. | .......... | 382/275 |
| 2008/0285655 A1 * | 11/2008 | Au et al. | .......... | 375/240.16 |

OTHER PUBLICATIONS

Verbeek, H. A. Vrooman, and L. J. Van Vliet. 1988. Low-level image processing by max\-min filters. Signal Process. 15, 3 (Oct. 1988), 249-258.*

Changming Sun. 2006. Moving average algorithms for diamond, hexagon, and general polygonal shaped window operations. Pattern Recogn. Lett. 27, 6 (Apr. 2006), 556-566.*

* cited by examiner

*Primary Examiner* — Vu Le
*Assistant Examiner* — Nathan Bloom
(74) *Attorney, Agent, or Firm* — Ella Cheong Hong Kong; Margaret Burke; Sam Yip (57) ABSTRACT

Methods and apparatuses for color denoising are described. There is provided an image processing method. The method comprises the steps of retrieving chrominance level for a plurality of pixels in a predetermined configuration; computing a weight for each pixel; applying the weight to the chrominance level for each the pixel; summing the weighted chrominance level to output a chrominance level for a center pixel at the center of said predetermined configuration; and repeating the above steps for every pixel per image. The color noise can be reduced while preserving the edge without any edge detection.

16 Claims, 8 Drawing Sheets

| x(i-8, j+8) | . | . | . | x(i-3, j+8) | . | . | x(i, j+8) | . | . | x(i+3, j+8) | . | . | . | x(i+8, j+8) |
|---|---|---|---|---|---|---|---|---|---|---|---|---|---|---|
| . | . | . | . | . | . | . | . | . | . | . | . | . | . | . |
| . | . | . | . | . | . | . | . | . | . | . | . | . | . | . |
| . | . | . | . | . | . | . | . | . | . | . | . | . | . | . |
| . | . | . | . | . | . | . | . | . | . | . | . | . | . | . |
| x(i-8, j+3) | . | . | . | x(i-3, j+3) | . | . | x(i, j+3) | . | . | x(i+3, j+3) | . | . | . | x(i+8, j+3) |
| . | . | . | . | . | . | . | . | . | . | . | . | . | . | . |
| . | . | . | . | . | . | . | . | . | . | . | . | . | . | . |
| x(i-8, j) | . | . | . | x(i-3, j) | . | . | x(i, j) | . | . | x(i+3, j) | . | . | . | x(i+8, j) |
| . | . | . | . | . | . | . | . | . | . | . | . | . | . | . |
| . | . | . | . | . | . | . | . | . | . | . | . | . | . | . |
| x(i-8, j-3) | . | . | . | x(i-3, j-3) | . | . | x(i, j-3) | . | . | x(i+3, j-3) | . | . | . | x(i+8, j-3) |
| . | . | . | . | . | . | . | . | . | . | . | . | . | . | . |
| . | . | . | . | . | . | . | . | . | . | . | . | . | . | . |
| . | . | . | . | . | . | . | . | . | . | . | . | . | . | . |
| . | . | . | . | . | . | . | . | . | . | . | . | . | . | . |
| x(i-8, j-8) | . | . | . | x(i-3, j-8) | . | . | x(i, j-8) | . | . | x(i+3, j-8) | . | . | . | x(i+8, j-8) |

Original        Processed

| QP | Overall | | | Chrominance only (P frames) | | |
|----|---------|---------|---------|---------|---------|---------|
|    | No filtering (kbps) | After filtering (kbps) | Bit rate reduction (%) | No filtering (average bit per frame) | After filtering (average bit per frame) | Bit rate reduction (%) |
| 10 | 9485.10 | 8600.70 | 9.32 | 80364.12 | 38776.94 | 51.75 |
| 14 | 6478.14 | 5543.49 | 14.43 | 47398.84 | 15843.94 | 66.57 |
| 18 | 3084.04 | 2641.88 | 14.34 | 19930.45 | 4899.33 | 75.42 |
| 22 | 687.72 | 576.05 | 16.24 | 4626.78 | 1139.76 | 75.37 |
| 26 | 141.86 | 120.84 | 14.82 | 720.76 | 291.00 | 59.63 |
| 30 | 56.05 | 51.28 | 8.51 | 118.92 | 53.39 | 55.10 |
| 34 | 29.39 | 28.11 | 4.36 | 24.84 | 15.96 | 35.75 |
| 38 | 18.84 | 18.37 | 2.49 | 8.65 | 4.80 | 44.51 |

FIG. 6e

Original

FIG. 7a

Processed

| QP | Overall | | | Chrominance only (P frames) | | |
|---|---|---|---|---|---|---|
| | No filtering (kbps) | After filtering (kbps) | Bit rate reduction (%) | No filtering (average bit per frame) | After filtering (average bit per frame) | Bit rate reduction (%) |
| 10 | 9585.37 | 8340.27 | 12.99 | 71846.41 | 30278.02 | 57.86 |
| 14 | 6327.60 | 5425.97 | 14.25 | 40571.06 | 10138.12 | 75.01 |
| 18 | 3220.81 | 2825.15 | 12.28 | 15844.73 | 2555.00 | 83.87 |
| 22 | 1159.84 | 1078.51 | 7.01 | 2741.00 | 496.10 | 81.90 |
| 26 | 415.08 | 397.31 | 4.28 | 468.35 | 144.18 | 69.22 |
| 30 | 185.64 | 180.84 | 2.59 | 87.53 | 35.06 | 59.95 |
| 34 | 92.01 | 90.72 | 1.40 | 23.67 | 15.43 | 34.81 |
| 38 | 46.37 | 45.68 | 1.49 | 11.43 | 7.80 | 31.76 |

FIG. 7e

LOW COMPLEXITY COLOR DE-NOISING FILTER

TECHNICAL FIELD

The present invention relates generally to digital image processing and, in particular, to a color denoising method for digital images.

BACKGROUND OF INVENTION

With the advance in technologies, color images or videos can be captured conveniently through various devices like digital cameras, cell phone cameras, and video recorders. Color itself can provide people with much more information than monochrome, and people are so used to color images that they prefer to view and print images in color with color displays and color printers, which are abundantly available.

The importance of color imaging has made its quality become essential to users. However, color noise is largely unavoidable owing to color interpolation on Mosaic sensors and electronic noise from circuits and cables, for instance. Color noise exists independently in each color, and people endeavor to reduce any existing color noise in images.

Low-pass filtering is a conventional way to reduce color noise, because noise normally comprises irregularities in an image and typically is regarded as such high-frequency components of an image. Consequently, low-pass filter can reduce such noise. However, since edges or color edges represent sharp changes and are made substantially of high-frequency components, edges are blurred if low-pass filtering is applied.

In an attempt to overcome the deficiencies of the low-pass filtering, techniques have been proposed that identify edges in an image to avoid blurring of such desired color transitions. For example, U.S. Pat. No. 5,241,370 issued on Aug. 31, 1993 to Desor describes using correlation to identify color transitions. The color transition is enhanced before the low-pass filtering is applied to maintain the sharpness. However, the technique only works on television signals and emphasizes on the horizontal transition only. Furthermore, a vertical digital filter must be used in this method.

U.S. Pat. No. 5,432,869 issued to Matsumoto on Jul. 11, 1995 describes the same principles. The problem of direction-oriented filtering has again made it less effective. Another way to retain the sharpness while suppressing the noise is discriminating the noise components from the edges as in U.S. Pat. No. 6,667,815 B1 issued to Nagao on Dec. 23, 2003 where edge detection is used to characterize the edges and then suppress only the noise that is separated according to color correlation. The method also enhances the image sharpness.

U.S. Patent Application Publication No. 20060050182A1 published on Mar. 9, 2006 in the name of Lee describes an adaptive color correction method in which chrominance of a pixel is adjusted according to the corresponding luminance of the pixel by a weighting procedure, resulting in an undesirable performance that the color-noise reduction is luminance-biased. Furthermore, no sharpening measures are adopted, making the blurring of edges unavoidable.

U.S. Patent Application Publication No. 20060055985A1 published on Mar. 16, 2006 in the name of Ikeda and U.S. Pat. No. 6,980,326 B2 issued to Tsuchiya on Dec. 27, 2005 describe noise suppression without sharpness degradation. Both use edge detection because the prior knowledge of edges in filter design is required to preserve the edges.

The foregoing problems of preserving the color for small objects and of edge detection and image sharpening are costly in computation.

Apart from color preserving on small objects and computational complexity issues, the above conventional technologies may lead to undesirable performance. Firstly, such conventional methods rely on luminance components and hence the resulting performance is luminance-biased. Secondly, adopting the use of fixed thresholding, luminance-biased and single-directional edge detection limits the suppression capability, which results in limited performance.

Thus, a need clearly exists for an improved method for color denoising.

SUMMARY

Accordingly, aspects of the present invention have been developed with a view to substantially eliminate the drawbacks described hereinbefore and to provide a low-complexity method for color denoising.

In accordance with an aspect of the present invention, there is provided an image processing method for color denoising. The method comprises the steps of:

retrieving chrominance level for a plurality of pixels in a predetermined configuration;

computing a weight for each said pixel;

applying said weight to said chrominance level for each said pixel;

summing said weighted chrominance level to output a chrominance level for a centre pixel at the center of said predetermined configuration;

repeating the above steps for every pixel per image.

The predetermined configuration may have a size of 17 pixels by 17 pixels.

The predetermined configuration may involve pixels clustering at the center thereof.

The predetermined configuration may comprise 5 pixels in a row. The 5 pixels are separated from each other by a plurality of pixels in a sequence of 4 pixels, 2 pixels, 2 pixels and 4 pixels. The row repeats for 4 times at a vertical distance of 4 pixels, 2 pixels, 2 pixels and 4 pixels.

The weight is dependent on difference between the chrominance level of pixel at the centre of said predetermined configuration and the chrominance level of pixel to which said weight is applied.

The weight can be computed by an approximation function.

The approximation function can give weight in integers.

The approximation function can make use of a look up table.

Other objects of the present invention besides the aforesaid shall be apparent to those skilled in the art in the light of the appended description, drawings and claims.

BRIEF DESCRIPTION OF DRAWINGS

Embodiments of the invention are described in more detail hereinafter with reference to the drawings, in which.

DETAILED DESCRIPTION

Methods and apparatus for color denoising are disclosed hereinafter. In the following description, numerous specific details, including window sizes, image resolutions, and the like are set forth. However, from this disclosure, it will be apparent to those skilled in the art that modifications and/or substitutions may be made without departing from the scope and spirit of the invention. In other circumstances, specific details may be omitted so as not to obscure the invention.

In a method in accordance with embodiment in the present invention, color noise can be reduced while preserving the edge without any edge detection. This is achieved by determining filter weights with a function of absolute difference between current pixels and neighboring pixels. For edge pixels, the difference is comparatively large and the corresponding weight is close to zero.

The embodiments of the present invention also provide a method that is implicitly related to chrominance data. In addition, the method provides edge detection and edge preservation in all directions. The embodiments of the present invention provide adaptive filtering and large window size and is capable of providing high accuracy statistical modeling. The embodiments of the present invention are efficient to implement and of low complexity. Meanwhile, the method provides high flexibility for large variety of implementation. For example, low complexity can be achieved by software approach. In an embodiment of the present invention, the computations required for one pixel comprise 25 multiplications and 24 additions.

Figure 1A:
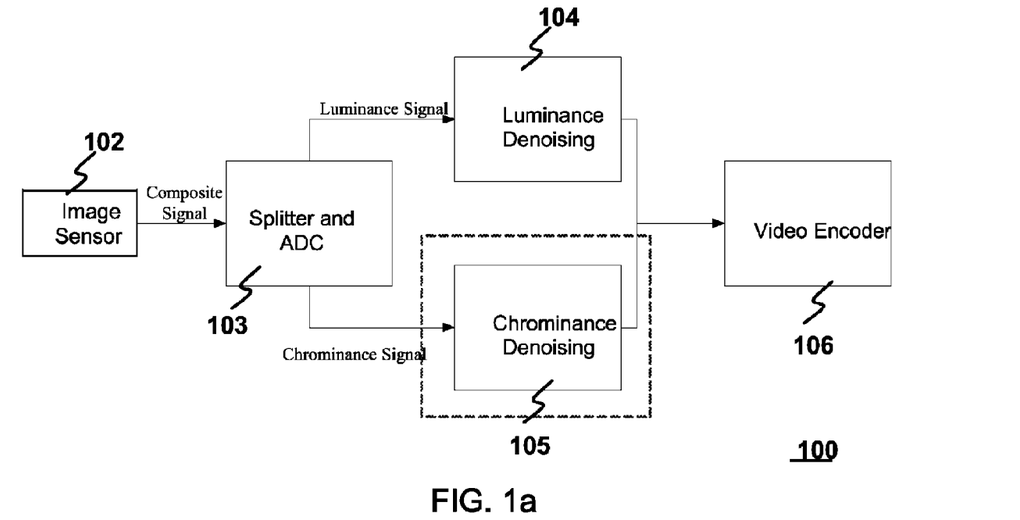
FIG. 1a is a block diagram illustrating denoising signals from an image sensor in accordance with an embodiment of the invention.
Figure 1B:
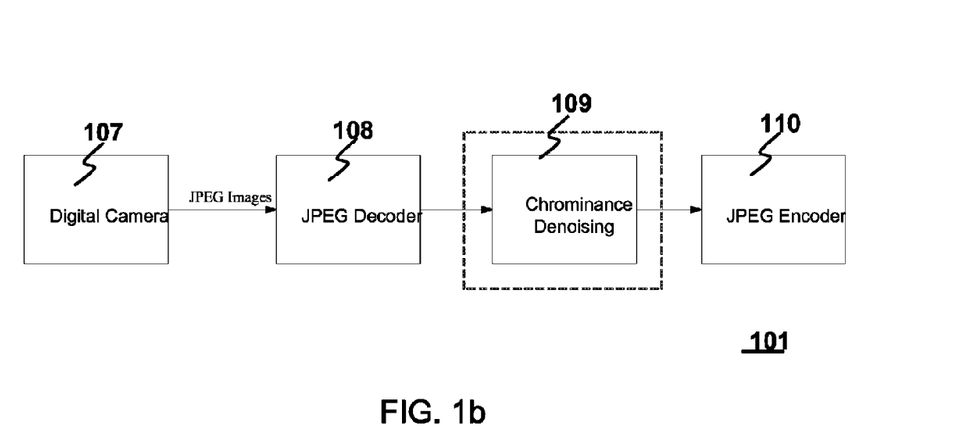
FIG. 1b is a block diagram illustrating denoising of JPEG images.

Color denoising can be applied under two situations of image capture, namely to photos and videos, in which any image capture device can be used such as digital camera, video camera etc. In FIGS. 1a and 1b, two implementations of the present invention are shown. In FIG. 1a, a video preprocessing system 100 is shown. A composite signal being the output signal from an image sensor 102, such as a CCD, is fed into an analogue-to-digital converter and splitter 103 to convert the same from an analogue signal into a digital signal before being split into chrominance and luminance signals. Besides the luminance denoising on the luminance signal by the luminance denoising unit 104, color denoising is applied on the chrominance signal. The processed signals from the luminance denoising unit 104 and the chrominance denoising unit 105 are output to a video encoder 106 to generate the video signal output.

FIG. 1b is a block diagram illustrating a system 101 for denoising of JPEG images. Instead of video preprocessing, in the case of photos taken by a still camera 107, it is the output image that becomes the input for the present invention. The still camera may be a digital one. An example of such an embodiment utilizes an internal data bus for transferring the output image of the digital camera module 107 to the JPEG decoder module 108. It will be obvious to a skilled person in the art that different image formats such as TIF, RAW, GIF, etc. besides JPEG may be practiced. The digital image from the digital camera 107 is fed into the JPEG decoder 108 and converted into the desired representation such as from RGB to YCrCb color space so that the chrominance denoising 109 can be carried out. The processed signal is output to a JPEG encoder 110 or any converter such as RGB converter to convert the same into desired format for an output image.

Figure 1C:
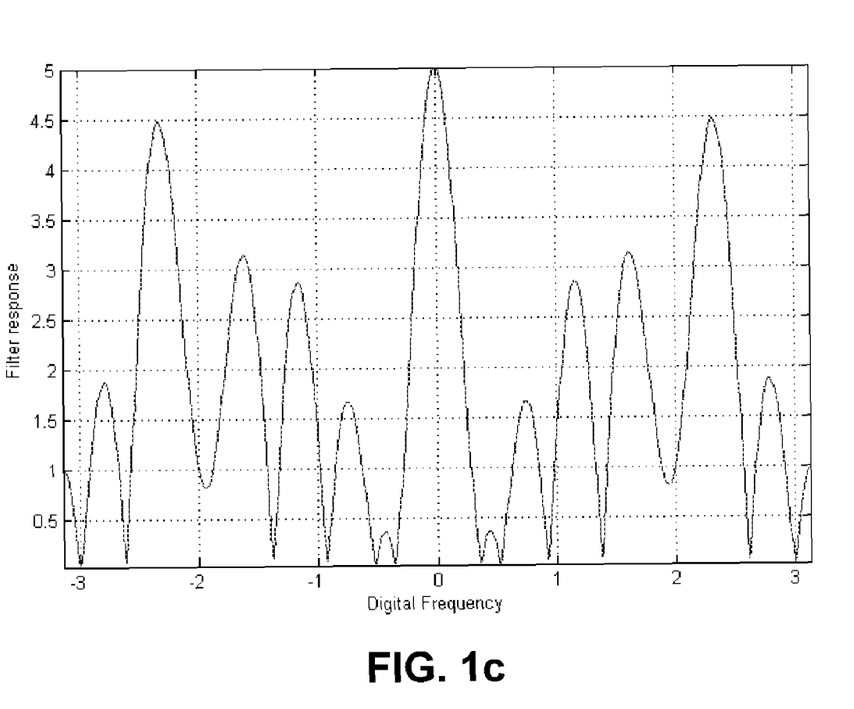
FIG. 1c is a chart illustrating the frequency response of the filter used in an embodiment of the invention.

For the chrominance denoising module 105 in FIG. 1a and 109 in FIG. 1b, color denoising is carried out by a spatial varying filter (SVF) with a 2D window that is applied per image. FIG. 1c shows the frequency response of an example of the filter. According to an embodiment of the present invention, the filter has low bandwidth and may be a low-pass and band-stop filter. The filter is center-biased with most sampling pixels located at the centre of the filter window so as to preserve edges of small objects.

Figure 2A:
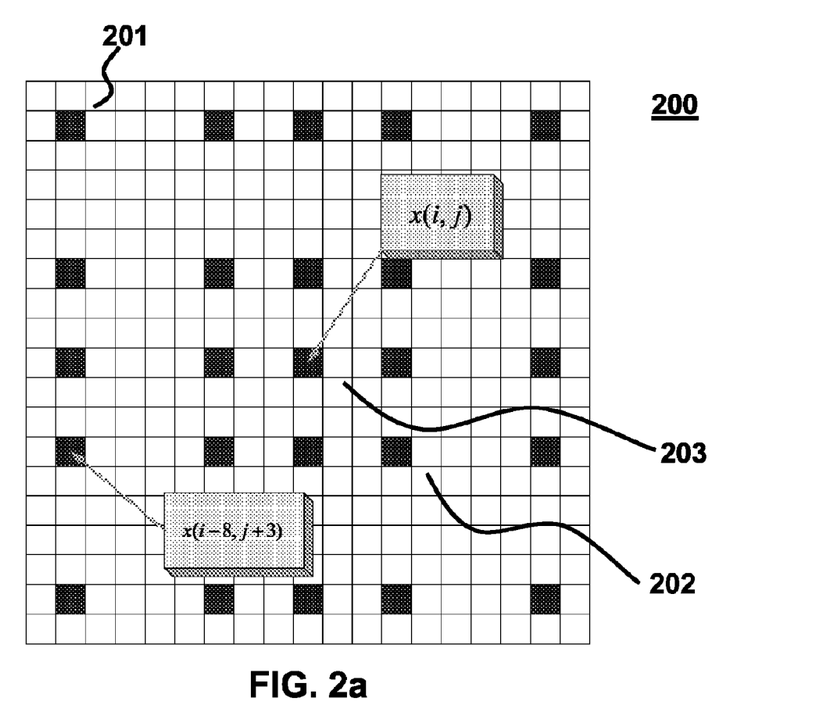
FIG. 2a and 2b show the predetermined configuration of a filter window.

FIG. 2a shows a 2D window according to an embodiment of the invention with a predetermined configuration of 17 pixels by 17 pixels in size for testing sequences in CIF format of 352×288 pixels.

In this 17 pixels by 17 pixels square configuration, 25 pixels are taken into consideration by the filter. The arrangement of those pixels for filter use is: in the $1^{st}$ row of the predetermined configuration, 5 pixels are sampled and these 5 pixels are separated from each other with gaps in the sequence of 4 pixels, 2 pixels, 2 pixels and 4 pixels. The same pattern of sampling occurs in the $6^{th}$, $9^{th}$, $12^{th}$ and $17^{th}$ rows in this predetermined configuration. Therefore, every $1^{st}$, $6^{th}$, $9^{th}$, $12^{th}$, and $17^{th}$ pixels in the aforesaid rows are used. The notations of these pixels are shown in FIG. 2c.

Figure 2B:
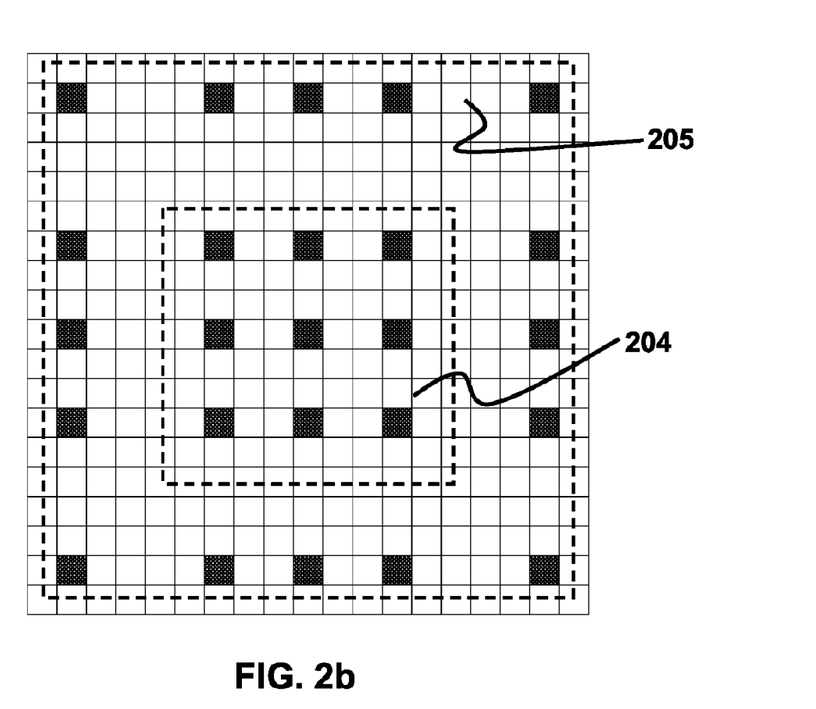
Figure 2C:
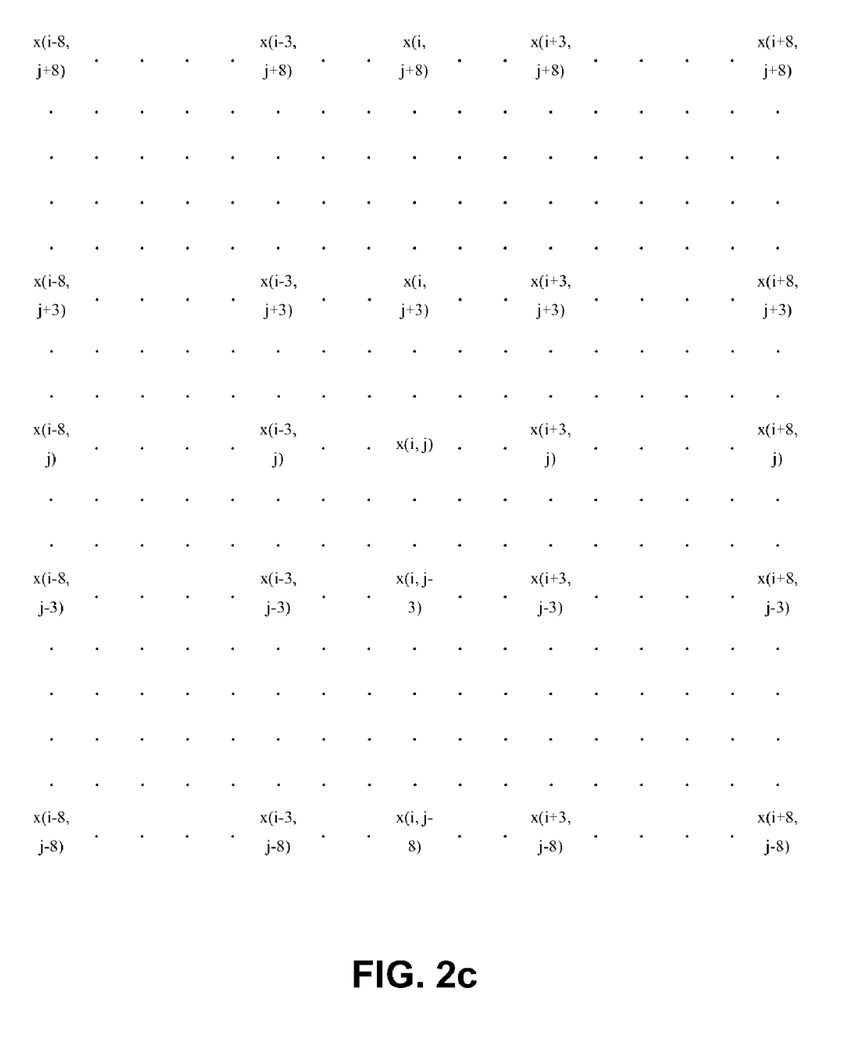
FIG. 2c shows the notation of the pixels in accordance with an embodiment of the invention.

As shown in FIG. 2a, the pixels at the locations in black color 201, 202 are sampled as the input of the filter. The filter window 200 is designed in such a way that the sampling is centralized around the pixel at (i, j), 203 which is currently being processed and is at the centre of such a predetermined configuration. The operation of the spatial varying filter is as follows:

For a pixel at (i, j), the filter function takes the chrominance levels for pixels colored in black in FIG. 2a or those notations in FIG. 2c as the input x(i+k, j+l). The pixels in black are denoted by the horizontal displacement k and the vertical displacement l from (i, j) while N denotes all the combinations of the desired displacements, giving the following algorithm (1) of the filter function with y(i, j) as the output thereof:

$$y(i, j) = \sum_{(k,l) \in N} a(i+k, j+l) \cdot x(i+k, j+l) \tag{1}$$

The filter function coefficient a(i+K,j+l) is an adaptive weight given by the following equation (2):

$$a(i+k, j+l) = \frac{w(i+k, j+l)}{\sum_{(k,l) \in N} w(i+k, j+l)}, (k, l) \in N \tag{2}$$

where w is given by the absolute difference in chrominance levels between the current pixel at (i,j) and the neighboring pixel at (i+k, j+l) within the filter window 200:

$$w(i+k,j+l)=f(|x(i,j)-x(i+k,j+l)|), (k,l) \in N \tag{3}$$

The function $f$ in equation (3) is for edge preserving and is further defined in the equation (4), where k is the parameter to control the level of edge preservation and its value is dependent on application:

$$f(i) = \left(1 - \frac{i}{255}\right)^k \quad (4)$$

Since the function $f$ is computational costly to be implemented, an approximation function can be used instead:

$$f'(i) = 2^{-i/4} \quad (5)$$

Figure 3:
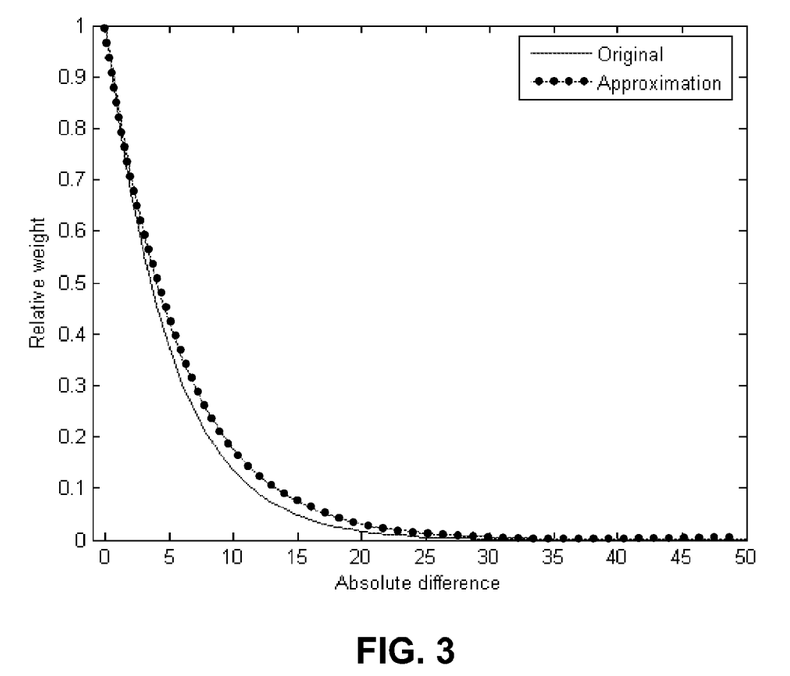
FIG. 3 is a plot of the approximation algorithm 1 and an original algorithm.

Using this approximation function, only shifting operations are needed and the result of the approximation can be found in FIG. 3. The plot shows relative weights as a function of absolute difference for the original algorithm and the approximation algorithm or function. However, the normalization problem must still be solved for the adaptive sum of all 25 weights in selected pixels in order to achieve computation reduction.

Further, to attain a computational efficient DSP implementation design, a lookup table (LUT) is used and the following equation (6) is employed for the function $f$:

$$f''(i) = 64 \times 2^{-\left[\frac{\min(i,31)}{4}\right]} \quad (6)$$

Eventually, f'''(i)=floor(f(i)).

Figure 4:
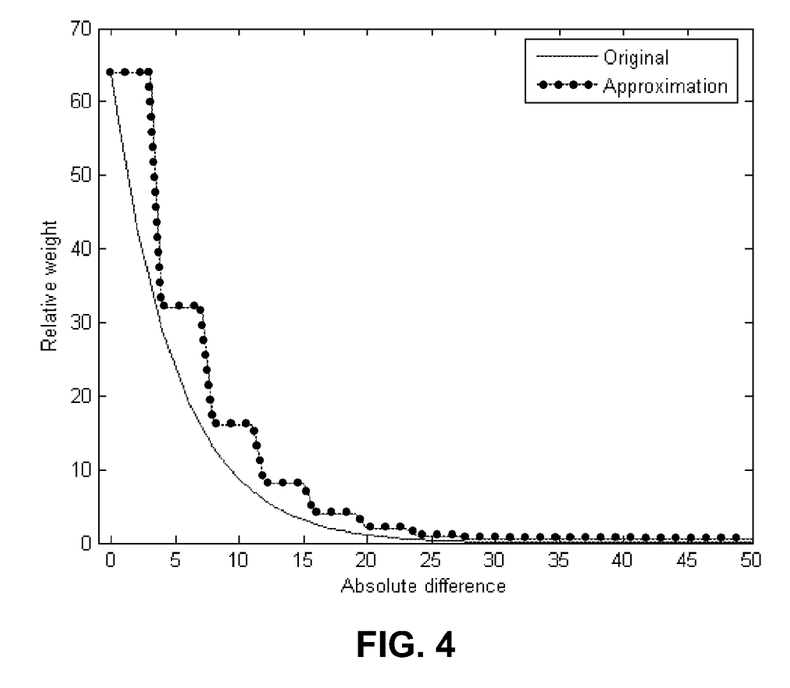
FIG. 4 is a plot of the approximation algorithm 2 and the original algorithm.

In FIG. 4, the results of the approximation and the original functions are shown. All relative weights given by the approximation function (7) are integers according to f'''(i)= floor(f(i)). This shows that the approximation algorithm is stepwise and tracks less closely on the original algorithm than in FIG. 3.

For a computational efficient DSP implementation design, we need to set the weight of current pixel (i, j) 203 in FIG. 2a must be set, which is a(x, y) to be 64 first. The equation (2) is used to compute the weights of the pixels in the inner square 204 as shown in FIG. 2b, which includes the current pixel (i, j) as well as the eight closest neighboring pixels in the predetermined configuration. One pixel in the outer square 205, which takes the sixteen pixels around the boundary of the predetermined configuration into account, is selected and the weight thereof is calculated. After summing up the weights of pixels in inner square 204 and weights of pixel in outer squares 205, if the sum is greater than 1024, then the last weight (the last one to be included in the summation for the pixel selected from the outer square 205 last) is reduced to ensure sum of weights to be equal to 1024.

If the sum is smaller than 1024 and if all the weights for pixels in the outer square have not been computed yet, another pixel in the outer square is selected to compute the weight thereof. Summing the weights for selected pixels in the outer square with all those in the inner square, the sum is checked again to see if it is larger than 1024 or not. On the other hand, if the sum is smaller than 1024 while all the weights for pixels in the outer squares have been included, the weight of current pixel a(x,y) is increased to ensure the sum of weights to be 1024. Setting the sum of weights to be 1024 removes the need of using division operations which are time consuming.

The design aims to ensure the sum of weights a(i+k, j+l) is 1024, that is:

$$\sum_{(k,l) \in N} a(i+k, j+l) = 1024 \quad (7)$$

Figure 5:
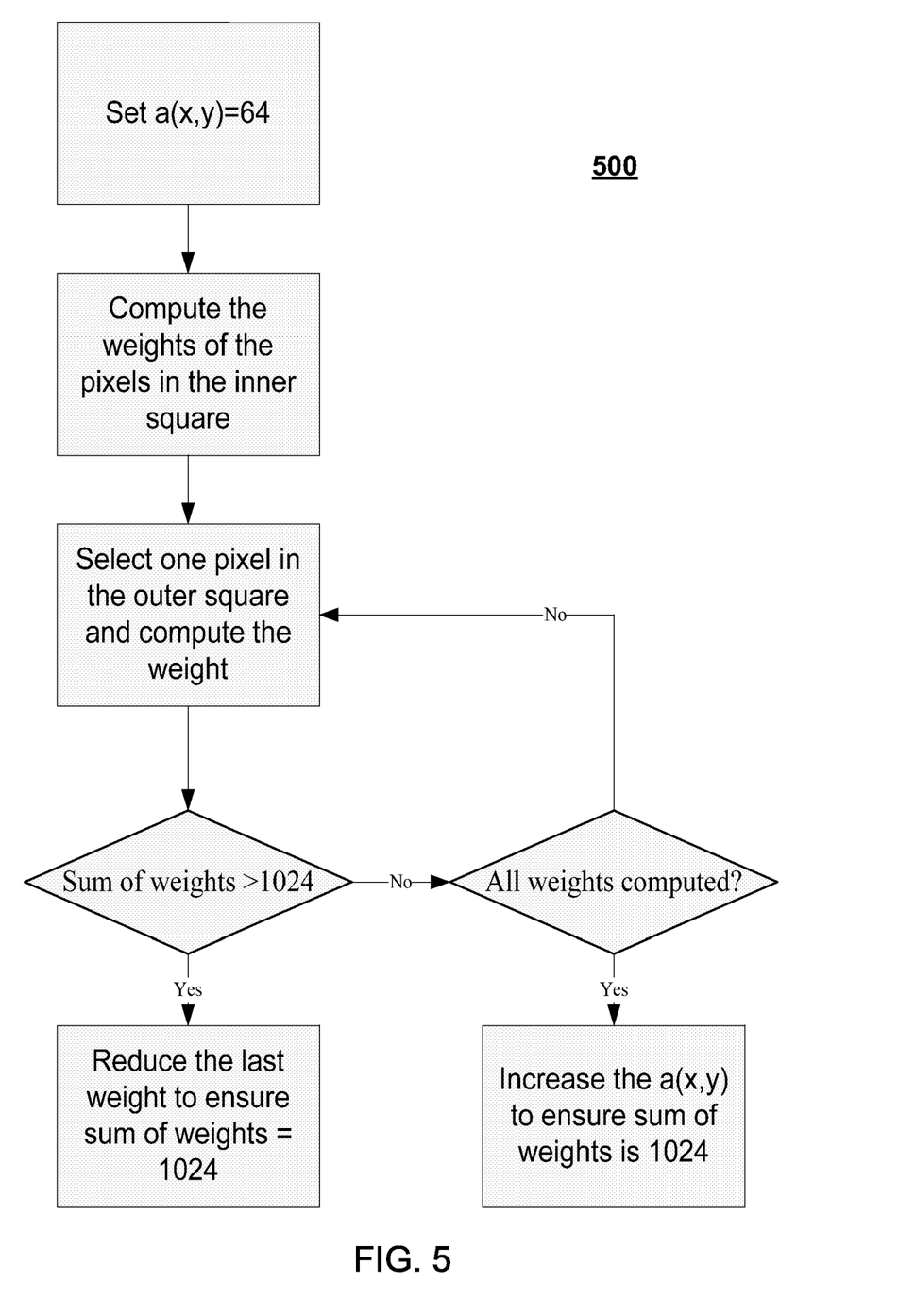
FIG. 5 is a flow diagram for the weight computation for a computational efficient DSP implementation design.

The normalization can be done by a right shift operation instead of a division operation, making the DSP implementation more computationally efficient. The flow diagram 500 in FIG. 5 illustrates the foregoing design. Processing commences in step 510, where a(x, y) is set equal to 64. In step 512, the weights of the pixels in the inner square are computed. In step 513, one pixel in the outer square is selected and the weight is computed. In step 516, if it is determined that the sum of weights is greater than 1024 then processing proceeds to step 518 where the last weight is reduced to ensure the sum of weights equals to 1024 before the flow 500 ends.

Alternatively, if it is determined that the sum of weights is not greater than 1024 then processing proceeds to step 520 where it is determined whether all weights is computed.

If it is determined in step 520 that all weights are computed, then the processing proceeds to step 530 where a(x, y) is increased to ensure the sum of weights to be 1024 before the flow 500 ends.

Alternatively, if it is determined that not all weights are computed, then the processing returns to step 514.

The spatial varying filter as described above is a non-recursive filter and no threshold is required to be determined for the filtering operation. Moreover, the embodiments of the invention can apply color denoising to all levels of luminance.

The results are illustrated in FIG. 6 and FIG. 7 with sequence 1 and sequence 2 as a test sample. With different Quantization Parameter (QP), the bit rates for images decrease after the image is processed by the present invention as shown in the tables.

Figure 6A:
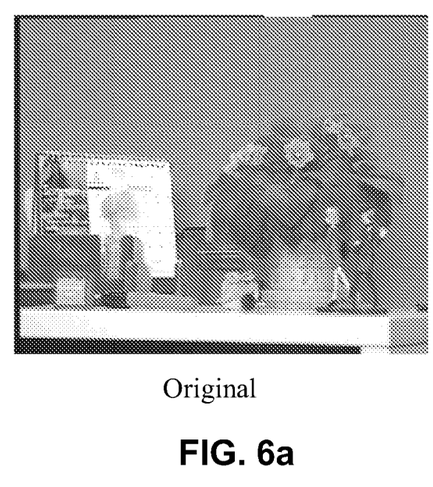
FIG. 6a-6e are the results for test sequence 1.
Figure 6B:
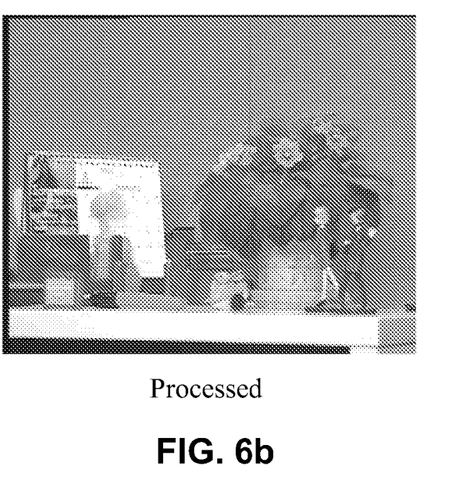

FIG. 6a is the original noisy image. It can be observed that there is much color noise in the image. Such color noise is most visible at grey regions. FIG. 6b is the processed image with sequence 1. It can be observed that most of the color noise is removed and no perceptual color noise exists.

Figure 6C:
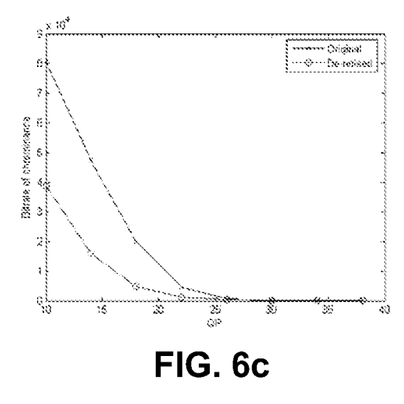

FIG. 6c shows the bitrate used for the chrominance components of the original noisy video sequence and the bitrate used for the chrominance components of the de-noised video sequence. It can be observed that the bitrates used for the chrominance components are reduced significantly, especially at high bitrates.

Figure 6D:
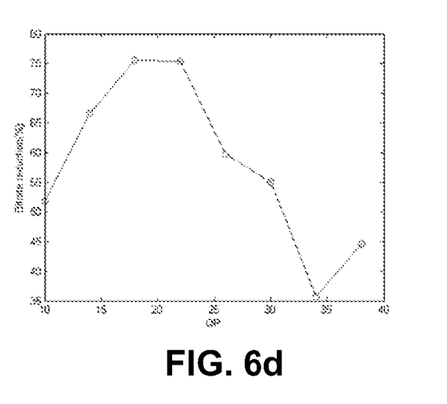

FIG. 6d shows the percentage of bitrates reduction of chrominance components and it can be up to 75%

Figure 6E:
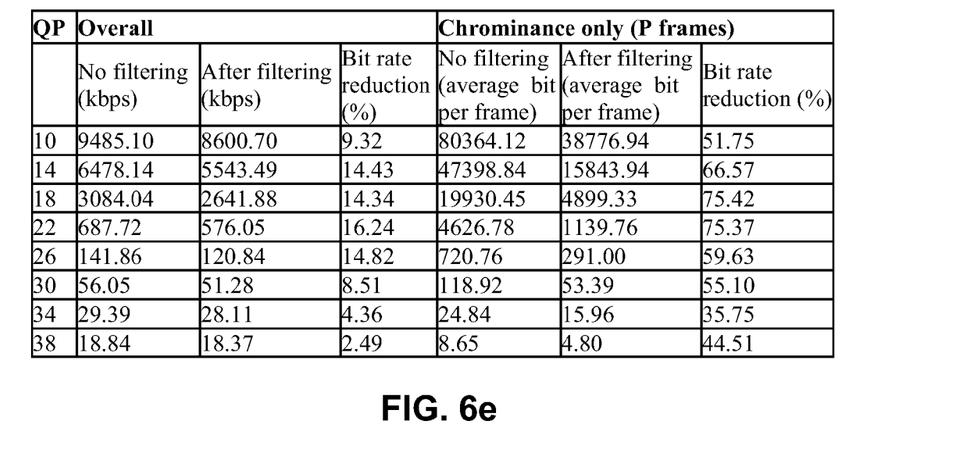
Figure 7A:
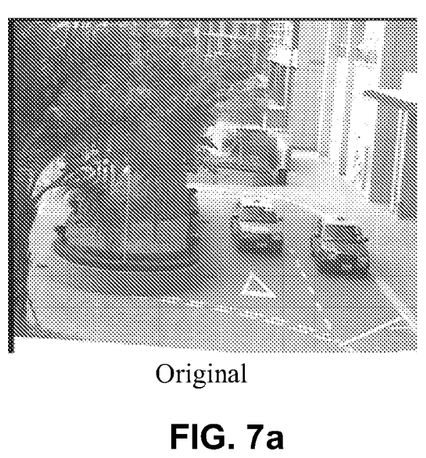
FIG. 7a-7e are the results for test sequence 2.
Figure 7B:
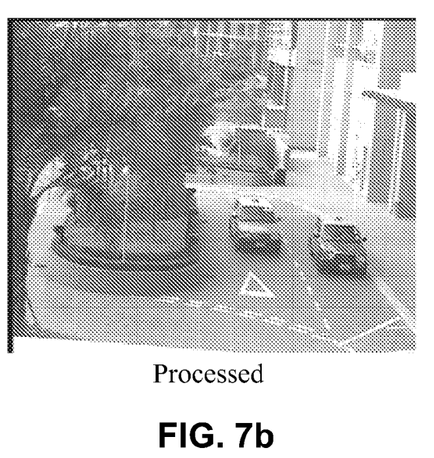
Figure 7C:
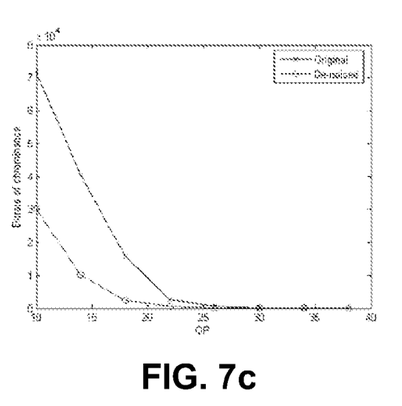
Figure 7D:
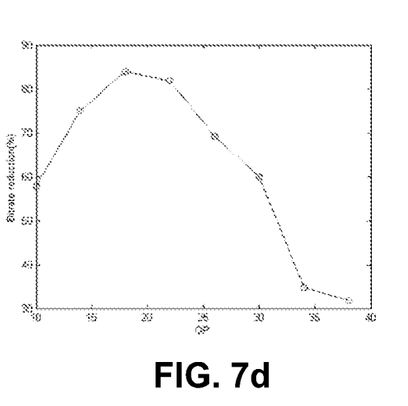
Figure 7E:
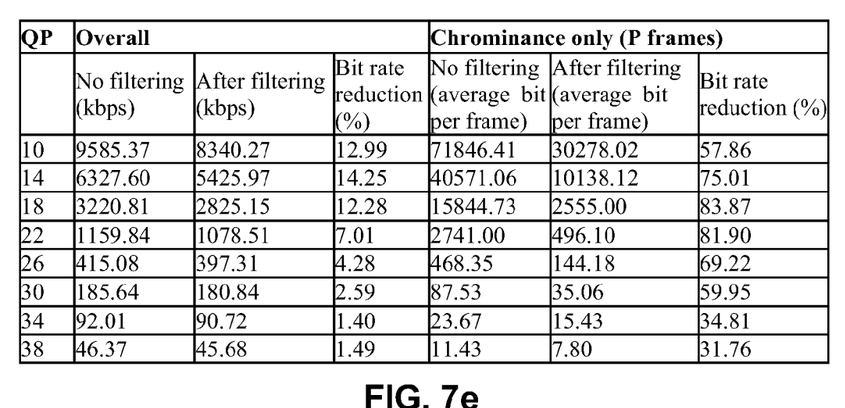

FIG. 6e shows the values of the overall bitrate used for the noisy video sequence and de-noised video respectively.

FIG. 7a-e show another set of experimental results corresponding to FIG. 6a-e by using another testing video sequence. It can be shown that the bitrate reduction is able to reach as high as 83% for chrominance components.

The embodiments of the present invention can be used as a selectable tool for video preprocessing.

The embodiments of the present invention can be used as a software module in other vertical application domain.

In respect of handling picture boundary, such boundaries are detected and the outbound pixels are excluded in the method.

In another embodiment in which the computation power of the device is large enough, it is not necessary to approximate the filter weights and the filter can be implemented directly.

The foregoing description of embodiments of the present invention are not exhaustive and any update or modifications to them are obvious to those skilled in the art, and therefore reference is made to the appending claims for determining the scope of the present invention.

What is claimed is:

1. A method for color denoising a digital image comprising:
retrieving a chrominance level for a plurality of current pixels in a filter window, the filter window including a first predetermined configuration and a second predetermined configuration, the first predetermined configuration being selected such that a pixel currently being processed, x(i, j) pixel, is at the center of a first group of current pixels to be sampled, each pixel in the first group of current pixels to be sampled being discontiguous with the x(i, j) pixel currently being processed;
setting a predetermined first weight, a(x, y), for the x(i, j) pixel being processed;
computing a weight for each pixel in the first group of current pixels to be sampled within the first predetermined configuration;
summing the first weight, a(x, y), and the weights of the sampled pixels in the first group of current pixels within the first predetermined configuration resulting in a sum of weights;
sampling and computing a weight to be added to the sum of weights for pixels one at a time from a second group of current pixels within the second predetermined configuration, the second predetermined configuration comprising pixels surrounding a boundary of the first predetermined configuration, pixels in the second group of current pixels to be sampled being discontiguous with sampled pixels in the first group of current pixels, the sampling and weight computing of pixels one at a time from the second group of current pixels and adding to the sum of weights continuing only until the sum of weights reaches a predetermined value, and if the predetermined value is not reached after all pixels in the second group of current pixels within the second predetermined configuration have been accounted for, increasing the first weight, a(x, y), until the predetermined value is reached;
applying the computed weights to the chrominance levels for each sampled pixel; and
repeating the above process for each pixel in the image.

2. The method according to claim 1 wherein said second predetermined configuration has a size of 17 pixels by 17 pixels.

3. The method according to claim 1, wherein said first predetermined configuration involves pixels clustering at the center of said second predetermined configuration.

4. The method according to claim 1, wherein said second predetermined configuration comprises 5 pixels in a row; being separated from each other by a plurality of pixels in a sequence of 4 pixels, 2 pixels, 2 pixels and 4 pixels; said row repeating 4 times at a vertical distance of 4 pixels, 2 pixels, 2 pixels and 4 pixels.

5. The method according to claim 1, wherein each of said weights is dependent on a difference between the chrominance level of a pixel at the centre of said first or second predetermined configuration and the chrominance level of a corresponding pixel to which said weight is computed.

6. The method according to claim 1, wherein each of said weights is computed by an approximation function.

7. The method according to claim 6, wherein said approximation function gives weights as integers.

8. The method according to claim 6, wherein said approximation function uses a look up table.

9. An apparatus for image processing for color denoising, comprising:
an image capture device that provides an analog image input;
an analog-to-digital converter for digitizing said analog image input;
a splitter for splitting said digital image into luminance and chrominance components;
a chrominance denoising processor for performing the processes of:
retrieving a chrominance level for a plurality of current pixels in a filter window, the filter window including a first predetermined configuration and a second predetermined configuration, the first predetermined configuration being selected such that a pixel currently being processed, x(i, j) pixel, is at the center of a first group of current pixels to be sampled, each pixel in the first group of current pixels to be sampled being discontiguous with the x(i, j) pixel currently being processed;
setting a predetermined first weight, a(x, y), for the x(i, j) pixel being processed;
computing a weight for each pixel in the first group of current pixels to be sampled within the first predetermined configuration;
summing the first weight, a(x, y), and the weights of the sampled pixels in the first group of current pixels within the first predetermined configuration resulting in a sum of weights;
sampling and computing a weight to be added to the sum of weights for pixels one at a time from a second group of current pixels within the second predetermined configuration, the second predetermined configuration comprising pixels surrounding a boundary of the first predetermined configuration, pixels in the second group of current pixels to be sampled being discontiguous with sampled pixels in the first group of current pixels, the sampling and weight computing of pixels one at a time from the second group of current pixels and adding to the sum of weights continuing only until the sum of weights reaches a predetermined value and if the predetermined value is not reached after sampling all pixels in the second group of current pixels within the second predetermined configuration have been accounted for, increasing the first weight, a(x, y), until the predetermined value is reached;
applying the computed weights to the chrominance levels for each sampled pixel;
repeating the above process for each pixel in the image; and
a video encode for outputting a video signal dependent on the digital image processed by said chrominance denoising processor.

10. The apparatus according to claim 9, wherein said first predetermined configuration involves pixel clustering at the center of said second configuration.

11. The apparatus according to claim 9, wherein said second predetermined configuration comprises 5 pixels in a row; being separated from each other by a plurality of pixels in a sequence of 4 pixels, 2 pixels, 2 pixels and 4 pixels; said row repeating 4 times at a vertical distance of 4 pixels, 2 pixels, 2 pixels and 4 pixels.

12. The apparatus according to claim 9, wherein each of said weights is dependent on a difference between the chrominance level of a pixel at the centre of said first or second predetermined configuration and the chrominance level of a corresponding pixel to which said weight is computed.

13. The apparatus according to claim 9, wherein said weight is computed by an approximation function.

14. The apparatus according to claim 13, wherein said approximation function gives weights as integers.

15. The apparatus according to claims 13, wherein said approximation function uses a look up table.

16. The apparatus according to claim 9, wherein said second predetermined configuration has a size of 17 pixels by 17 pixels.

* * * * *